Sept. 10, 1935.　　　　R. J. STOCK　　　　2,014,191
ILLUMINATING DEVICE
Filed June 14, 1933　　　　2 Sheets-Sheet 1
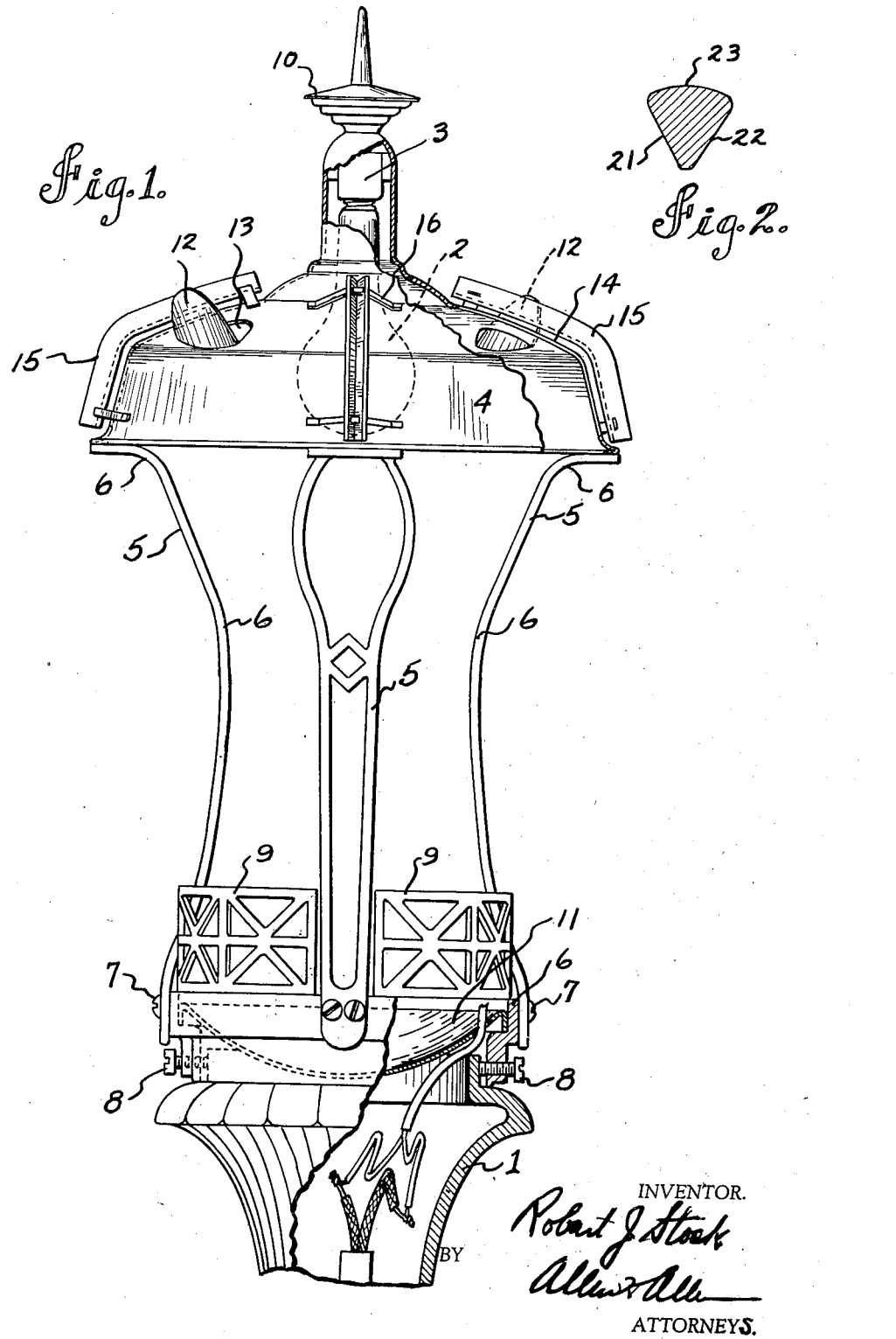

Sept. 10, 1935. R. J. STOCK 2,014,191
ILLUMINATING DEVICE
Filed June 14, 1933 2 Sheets-Sheet 2
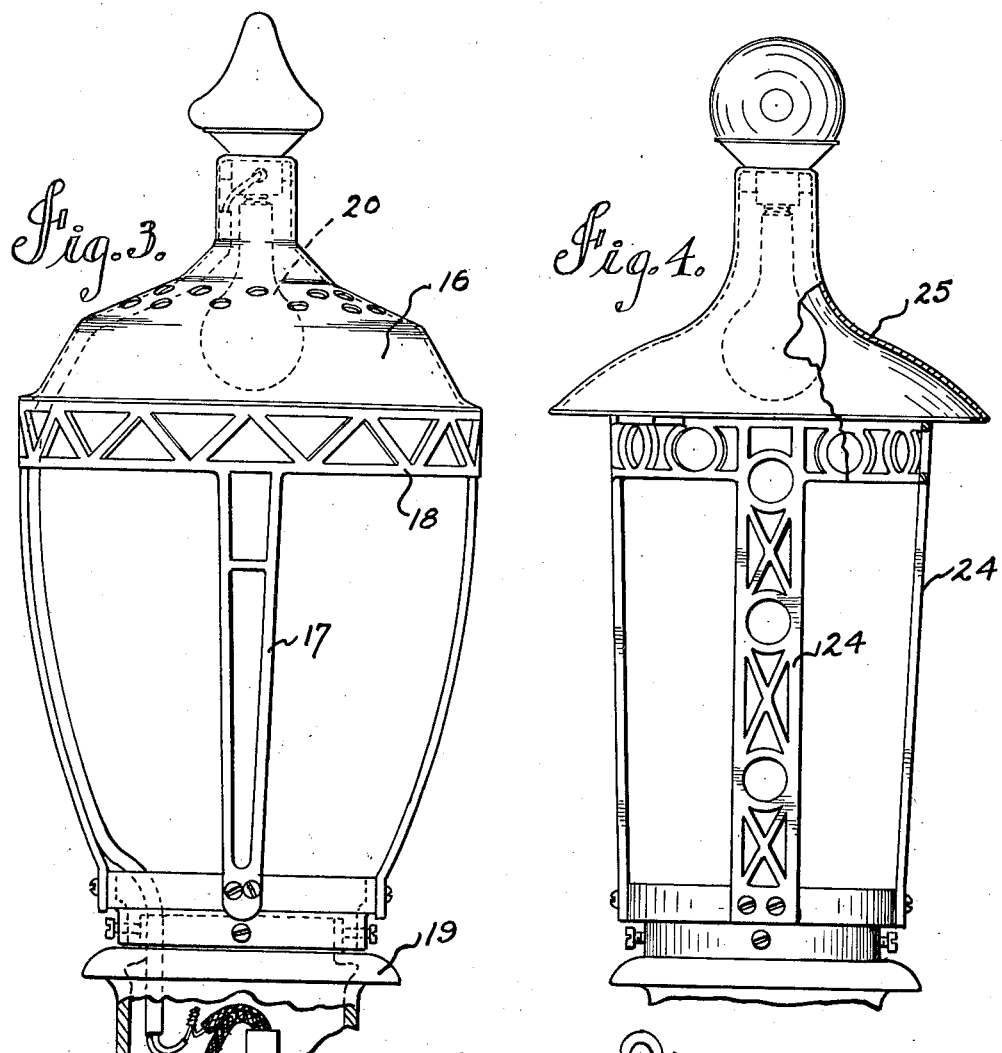
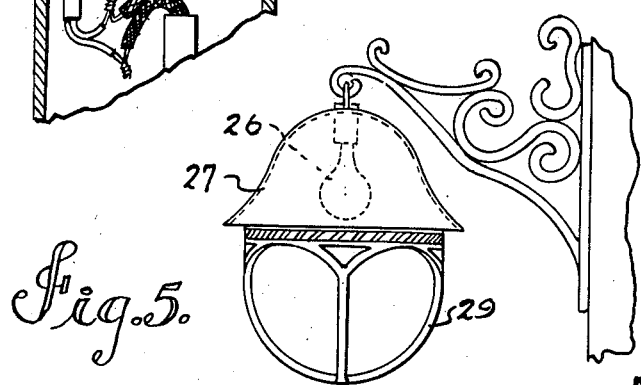
INVENTOR.
Robert J. Stock
BY
ATTORNEYS Patented Sept. 10, 1935

2,014,191

UNITED STATES PATENT OFFICE 2,014,191

ILLUMINATING DEVICE

Robert J. Stock, Cincinnati, Ohio

Application June 14, 1933, Serial No. 675,785

10 Claims. (Cl. 240—25)

My invention relates to illuminating devices, finding their particular application in highway work, and for the illumination of parkways, traffic lanes, pedestrian islands and the like. Illuminating devices for this purpose have hitherto taken the form either of a pedestal lamp, or a suspended lamp. In ordinary use they have comprised a source of illumination such as an incandescent bulb, a reflector and a globe of glass, together with such mounting and supporting devices as may be desired. If a colored light was necessary, the practice has been to color the glass and globes, which might completely screen the source of illumination, or might screen only such part of it as would be visible from certain directions.

In the maintenance of highway illuminating devices, the glass globes or shades have been a major item of expense, for the reason that they are subject to accidental or deliberate breakage, and also require frequent cleaning. Moreover, the construction of the usual illuminating devices has been such that considerable time and effort is required to remove the glass globes for washing. Finally, the glass globes cut down to an appreciable extent the efficiency of the light.

It is an object of my invention to provide an illuminating device which does not require a glass globe, or the like, but in which provision is made both for rendering the illuminating device visible from a plurality of directions, and also for tinting the color of the light visible from at least certain directions, to desired shades. It is an object of my invention to provide an illuminating device which depends for its primary visibility from certain directions upon the principle of reflection.

It is an object of my invention to produce an illuminating device, the light from which, as viewed from certain directions, is tinted by reflection from colored surfaces.

It is still another object of my invention to produce a light which will give a direct illumination to objects situated generally beneath it, but which, as viewed from a distance or in a more nearly horizontal direction, will present to the observer a series of highly illuminated reflecting surfaces.

Still another object of my invention is to provide an illuminating device of more artistic and beautiful appearance when in use.

These and other objects of my invention which will be set forth hereinafter or will be apparent to one skilled in the art upon reading these specifications, I accomplish by that certain construction and arrangement of parts of which I shall now describe certain preferred embodiments, reference being had to the drawings, wherein Figure 1 is an elevational view of one form of my device.

Figure 2 is a sectional view of one form of rib or supporting member which I may use.

Figure 3 shows another form of illuminating device embodying my invention.

Figure 4 shows a type in which light from the main reflector impinges directly upon the outer surfaces of reflecting elements.

Figure 5 shows a type of suspended illuminating device embodying my invention.

Briefly, in the practice of my invention, I provide a source of illumination, an example of which is an incandescent bulb, and a main reflector, the purpose of which is primarily to direct light from the source of illumination into certain desired direct paths, and to screen the source of illumination from direct visibility in certain directions. Also, I provide a source of members which may be supporting members either for the lamp and reflector, or for an ornamental finishing member for the illuminating device, but which are adapted to act as reflectors when illuminated by direct or indirect rays from the light source. These members are ornamental in their nature, and will be treated so as to be highly reflective. They may also, if desired, be provided with special facets or reflecting surfaces. When colored, they will impart a color tone to the reflected light.

In Figure 1, I have shown an illuminating device mounted upon a pedestal 1. It comprises a lamp 2 in a suitable socket 3, the lamp being surrounded by a reflector indicated generally at 4. A plurality of bar elements 5, preferably ornamental in their nature, support the reflector and lamp above the top of the pedestal 1. At their bottoms they may be attached to a collar 6, as by bolts 7, which collar fits around the upper part of the pedestal, and may be provided with clamping set screws 8, or some other means to hold it in position. An ornamenting grill-work 9 has been shown surmounting the collar 7. An ornamental pediment indicated generally at 10 may be positioned above the reflector 4, and may serve in part as a housing for the socket member 3.

It will be noted in the embodiment of my invention shown in Figure 1, that the bars 5 are bent inwardly intermediate their ends, as shown at 6, so that these bars lie substantially wholly beneath the reflector 4, and inwardly of the edges thereof. As a consequence, light proceeding from bulb 2 and reflected by the reflector is adapted to impinge upon the outer sides of the bars 5, while, of course, the inner sides of these bars will be brightly illuminated by both direct and reflected light. If the device of Figure 1 is viewed horizontally, as indicated in that figure, the bulb 2 will be screened from the eye by the reflector 4, but the bars 5 will be brightly illuminated from all sides. If these bars are made of or coated with a highly reflective substance, they will stand out brilliantly at night. Indeed, these bars have, when so illuminated, more or less the appearance of gas filled tubes. They serve not only to increase the beauty of my device, but also to make it visible from the horizontal position. Ordinarily, I prefer to make my bars of iron or other suitable metal, and to give them a coating of highly reflective white or colored baked vitreous enamel, but they may be otherwise treated, as desired, or the bars may be made of substance which does not require treatment in order to render it highly reflective.

In order to increase the effectiveness of the illumination, I prefer to place in the base of my device a supplementary reflector 11, which catches that portion of the light which would be cut off in any event by the top portion of the pedestal, and returns it for the illumination of the bars 5 and their parts. The ornamental grill-work 9 may likewise be made of reflective substance, or have a reflecting surface for the same purposes. Instead of the reflector 11, I may, if desired, employ an additional source of illumination at the bottom of my device.

It will be seen that direct rays from the bulb 2 may pass in a generally downward direction to illuminate the ground or objects around the base of the pedestal 1, and also (depending upon the size and proportion of the pedestal) to illuminate it. The light reflected from the bars and other ornamental structures is primarily visible from a horizontal direction.

In order still further to increase the efficiency and duty of my device when viewed from the horizontal direction, I may strike up from my reflector, tongues or members 12, also acting in the nature of reflectors. Direct light from the bulb 2 passes through the holes 13 left by the striking up of the members 12, and is reflected by these members so as brightly to illuminate the pediment portion 10. I also prefer to coat a plurality of radially disposed, longitudinal slots 14 in my reflector 4, and to position above these slots bar members 15, held by brackets 16. These bar members preferably have reflecting surfaces disposed at an acute angle to each other as shown. A convenient way of forming these bars is by bending sheet metal into generally a V-shape. Light passing from the bulb through the slits 14 brightly illuminates both reflecting faces of the bars 15. In this way I provide reflecting surfaces essentially above my reflector 4, which gives me more reflecting light visible horizontally, and also increases the beauty of my design because the general elements of its structure are carried up over the reflector 4 and terminate in the illuminated pediment 10. Any or all of the reflecting elements may be colored to give a tint to the reflected light. In this way I may provide, by way of example, a light which will directly illuminate a loading platform or traffic island with white light, and which, as viewed from a distance, will give a red signal to the motorist.

In Figure 3 I have shown a somewhat simpler form of device in which the reflector 16 is supported by bars 17, terminating in an ornamental grill-work 18 above the top of the pedestal 19. In this form of my invention the bars will be illuminated upon their insides by direct light from the source of illumination 20; and all bars will be brightly visible, excepting the bar directly toward the observer. I am enabled, however, to secure in this form of my device visible illumination of all bars by making the bars as shown in Fig. 2 in cross section, where angularly disposed facets or surfaces 21 and 22 join with another reflecting surface 23 to form the sides of an essentially triangularly shaped bar. This particular form is not a limitation upon my invention, but is illustrative of the form in which the bars have outwardly, angularly disposed reflecting surfaces adapted to be illuminated by cross reflection from other bars or ornamental structures.

In Figure 4 I have shown a reflective structure 24, surrounded by a reflector 25, which, however, extends beyond the outer portions of the reflected structure on all sides so as to illuminate this structure on its outer sides.

In the type of device shown in Figure 5, the source of illumination 26 is enclosed in a reflector 27, to which a reflective structure 29 is attached. This reflective structure may take whatever form is desired, and the several bars or other members which go to make it up may be provided with reflective facets, or the like.

I have described several modifications of my invention, but other modifications thereof will be within the skill of the worker in the art to produce without departing from the spirit of my invention.

Having thus described my invention, what I claim as new and desire to secure by Letters Patent, is:—

1. In combination, a source of illumination, a reflector shielding said source of illumination from view in one direction, means supporting said reflector, said means comprising a plurality of reflective bodies, a base member, said bodies joining said base member and said reflector, said bodies being adapted strongly to reflect light from said light source so as to be visible from said mentioned direction, said reflector terminating in a pediment and being perforated for the passage of light, supplementary reflectors located adjacent said perforations for reflecting portions of light passing therethrough onto said pediment, additional perforations in said reflector of elongate shape, reflective elements positioned adjacent said perforations to be illuminated by light passing therethrough, and constituting in appearance continuations of said bars.

2. In an illuminating device, the combination of a light source, a reflector, shielding said light source from view in one direction, and a plurality of supporting means for said light source and reflector, said supporting means supporting said reflector at its periphery and lying in the path of light from said source, said supporting means constituting reflective means adapted to be illuminated by said light source, and visible from said first mentioned direction.

3. In an illuminating device, the combination of a light source, a reflector supporting said light source and shielding said light source from view in one direction, and a plurality of supporting means supporting said reflector at its periphery and lying in the path of light from said source, said supporting means constituting reflective means adapted to be illuminated by said light source, and visible from said first mentioned direction.

4. In an illuminating device, a structure comprising a source of illumination and a reflector supported above a pedestal by means of members formed to suggest the outlines of a globe, said reflector being positioned to obscure the source of illumination when viewed from a horizontal direction, and said members being highly reflective, and being disposed in the path of the reflected light from said source so as to be visible from said horizontal direction.

5. In an illuminating device, a structure comprising a source of illumination and a reflector supported above a pedestal by means of ornamental members formed so as to suggest the outlines of a housing, said reflector being positioned to obscure the source of illumination when viewed from a horizontal direction, said members having a highly reflective surface and being disposed in the path of the light from said source so as to be visible from said horizontal direction.

6. In an illuminating device, a structure comprising a source of illumination and a reflector supported above a pedestal by means of ornamental members formed so as to suggest the outlines of a housing, said reflector having an ornamental pediment above it, said reflector being positioned to obscure the source of illumination when viewed from a horizontal direction and being perforated to permit the passage of light, supplementary reflectors positioned adjacent said perforations for reflecting portions of light passing therethrough onto said pediment, said members having highly reflective surfaces and being disposed in the path of the light from said source so as to be visible from said horizontal direction.

7. In an illuminating device, a structure comprising a source of illumination and a reflector supported above a pedestal by means of ornamental members formed to suggest the outlines of a housing, said members having highly reflective surfaces, and being characterized by facets whereby substantially all portions of said members are made visible by direct or reflected light.

8. In an illuminating device, a structure comprising a source of illumination and a reflector supported above a pedestal by means of ornamental members formed to suggest the outlines of a housing, said members having highly reflective surfaces, and having a cross-section comprising at least two sides converging in an acute angle, disposed so that the vertex of the said angle points radially outward, whereby substantially all portions of said members are made visible by direct or reflected light.

9. In an illuminating device, a structure comprising a reflector and a source of illumination, and a plurality of ornamental members terminating at the periphery of said reflector, formed to suggest the outline of a housing, said members having highly reflective surfaces and being positioned in the path of light from said source, whereby substantially all portions of said members are made visible by direct or reflected light.

10. In an illuminating device, a structure comprising a source of illumination and a reflector supported above a pedestal by means of ornamental members formed so as to suggest the outlines of a housing, said reflector having an ornamental pediment above it, said reflector being positioned to obscure the source of illumination when viewed from a horizontal direction and provided with means for reflecting a portion of light from said source upon said pediment, the said ornamental members having highly reflective surfaces and being disposed in the path of the light from said source so as to be visible from said horizontal direction.

ROBERT J. STOCK.